(No Model.) 7 Sheets—Sheet 1.
W. R. PULLMAN & H. SMITH.
MACHINE FOR TREATING HIDES.
No. 491,446. Patented Feb. 7, 1893.
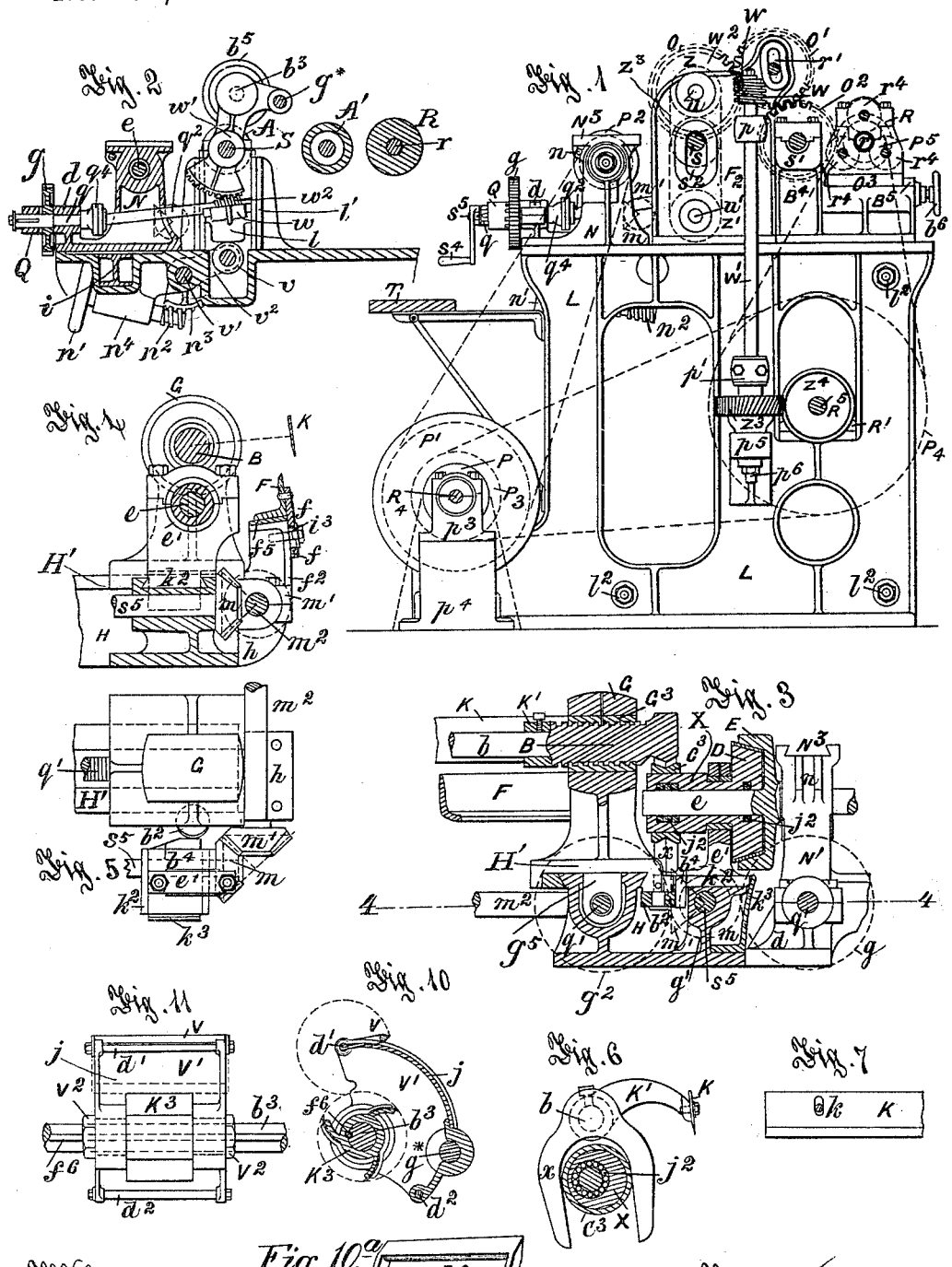
Witnesses:
John C. Wilson
Percy C. Bowen
Inventors:
William R. Pullman
Harry Smith
by Whitman & Wilkinson
Attys.

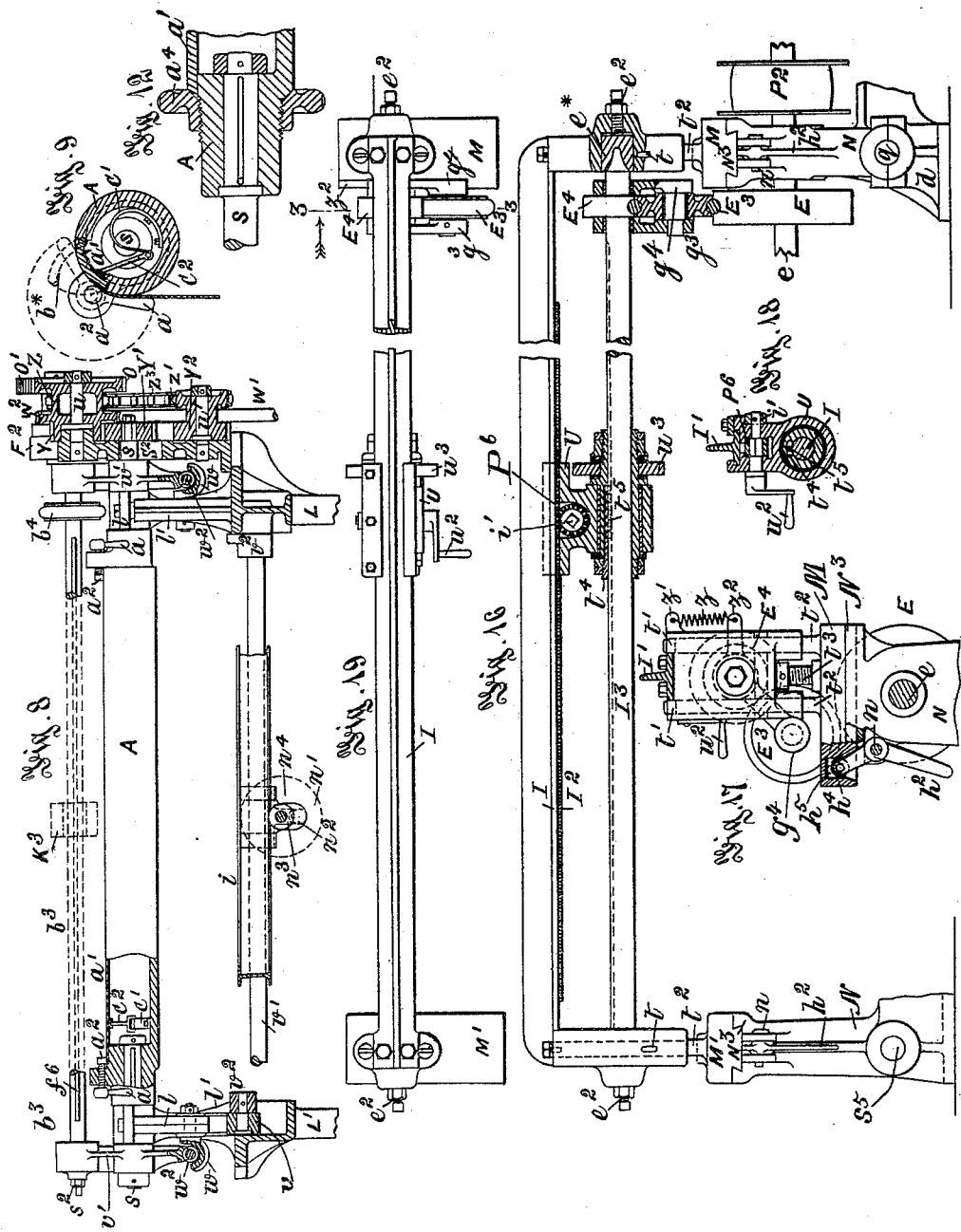

(No Model.) 7 Sheets—Sheet 3.
W. R. PULLMAN & H. SMITH.
MACHINE FOR TREATING HIDES.
No. 491,446. Patented Feb. 7, 1893.
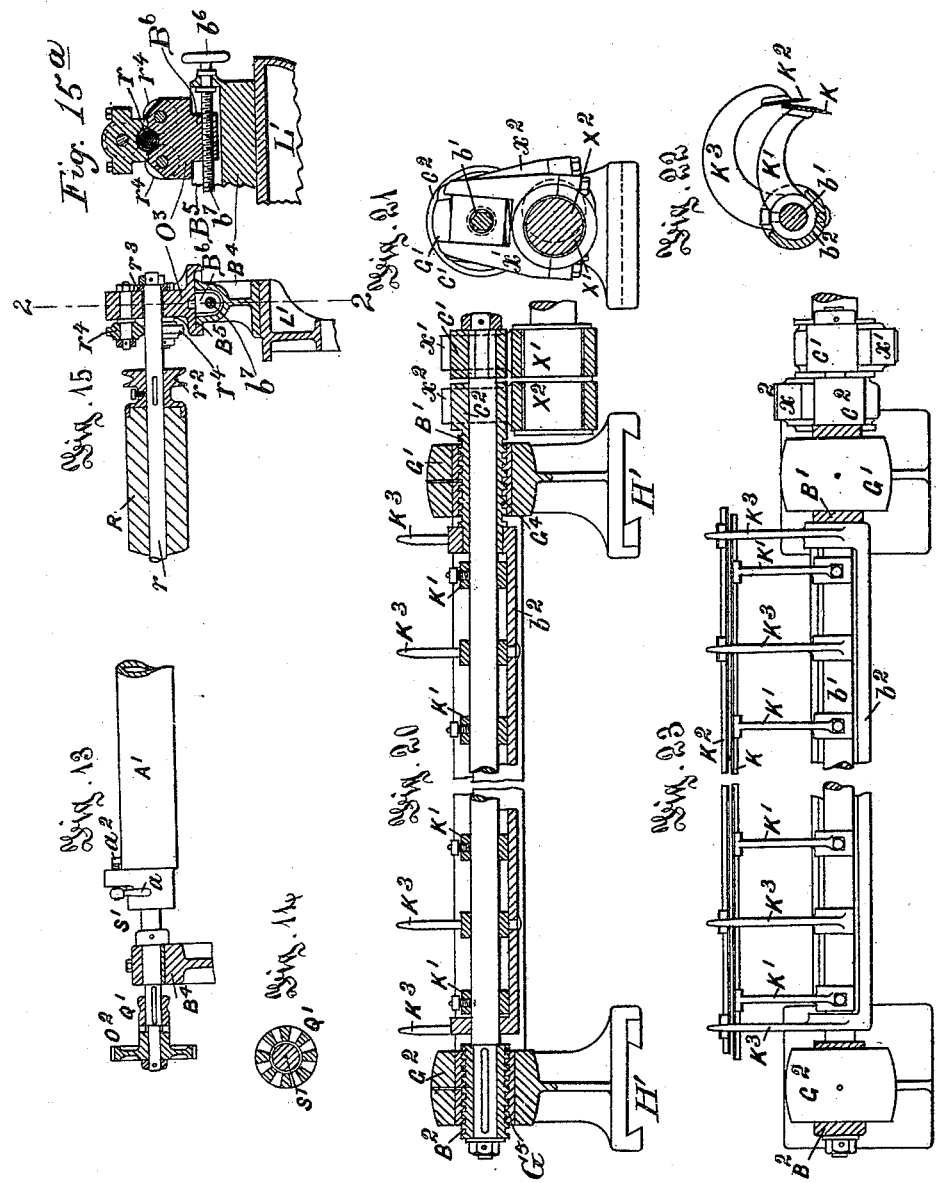
Witnesses:
John C. Wilson
Percy C. Bowen
Inventors:
William R. Pullman &
Harry Smith,
by Whitman & Wilkinson
Attys.

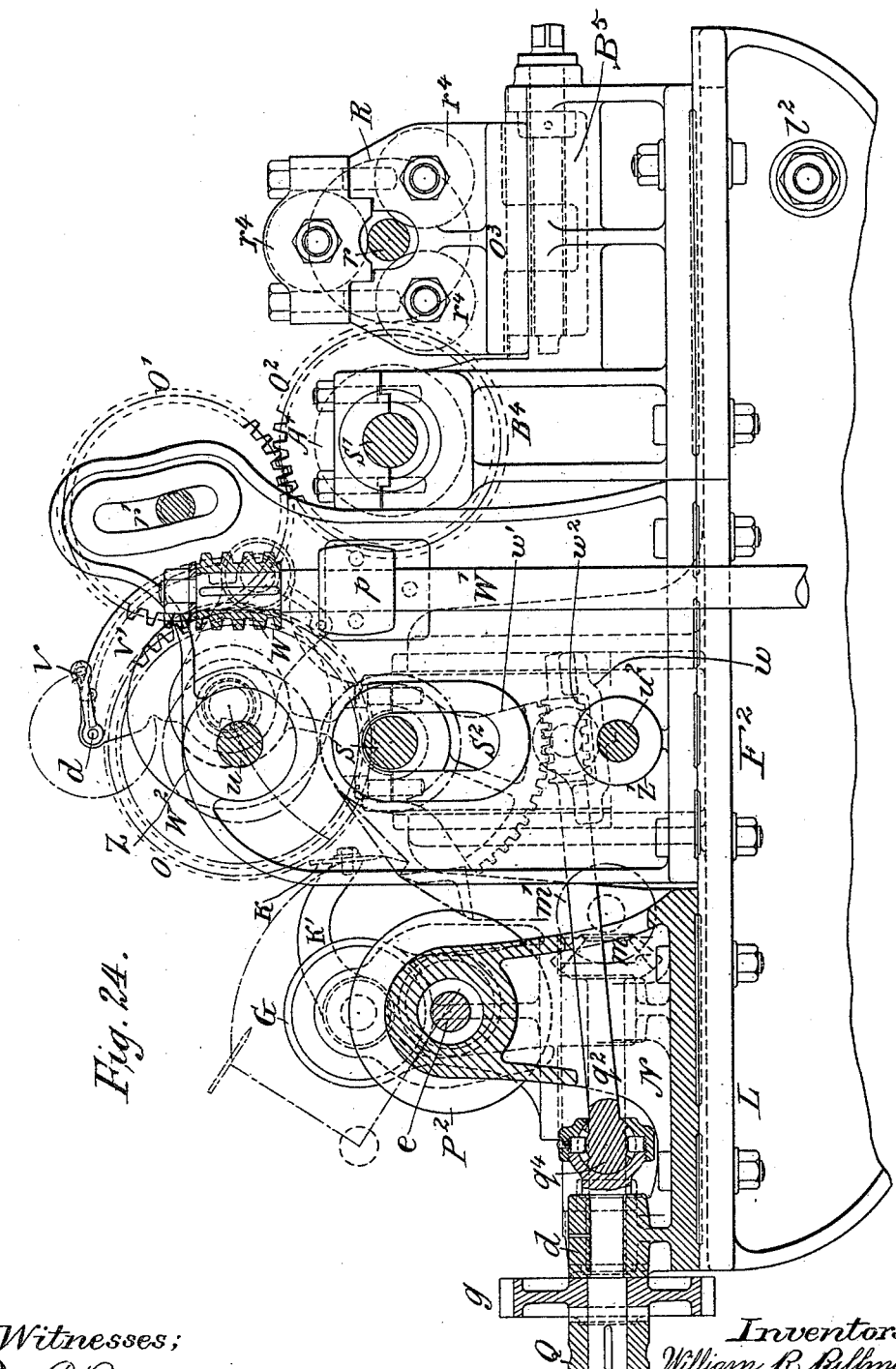

(No Model.) 7 Sheets—Sheet 5.
W. R. PULLMAN & H. SMITH.
MACHINE FOR TREATING HIDES.
No. 491,446. Patented Feb. 7, 1893.
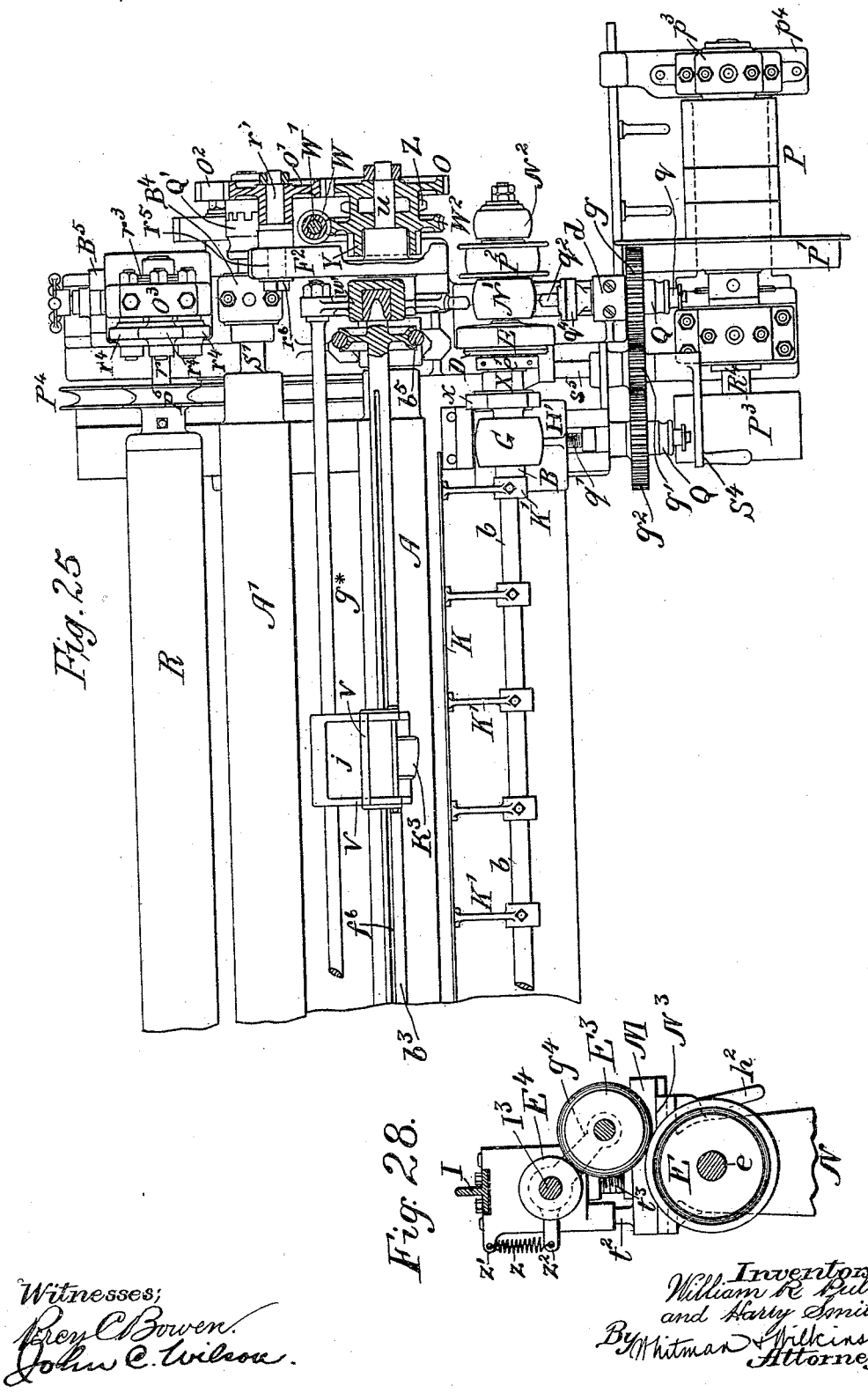

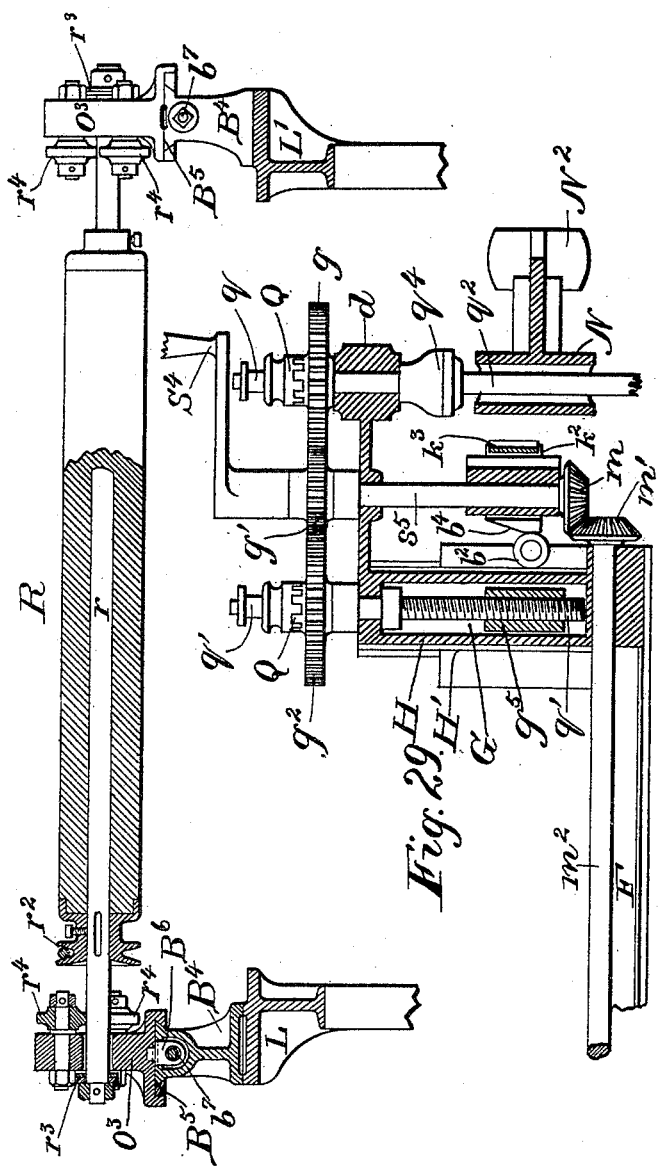

(No Model.) 7 Sheets—Sheet 7.
W. R. PULLMAN & H. SMITH.
MACHINE FOR TREATING HIDES.
No. 491,446. Patented Feb. 7, 1893.
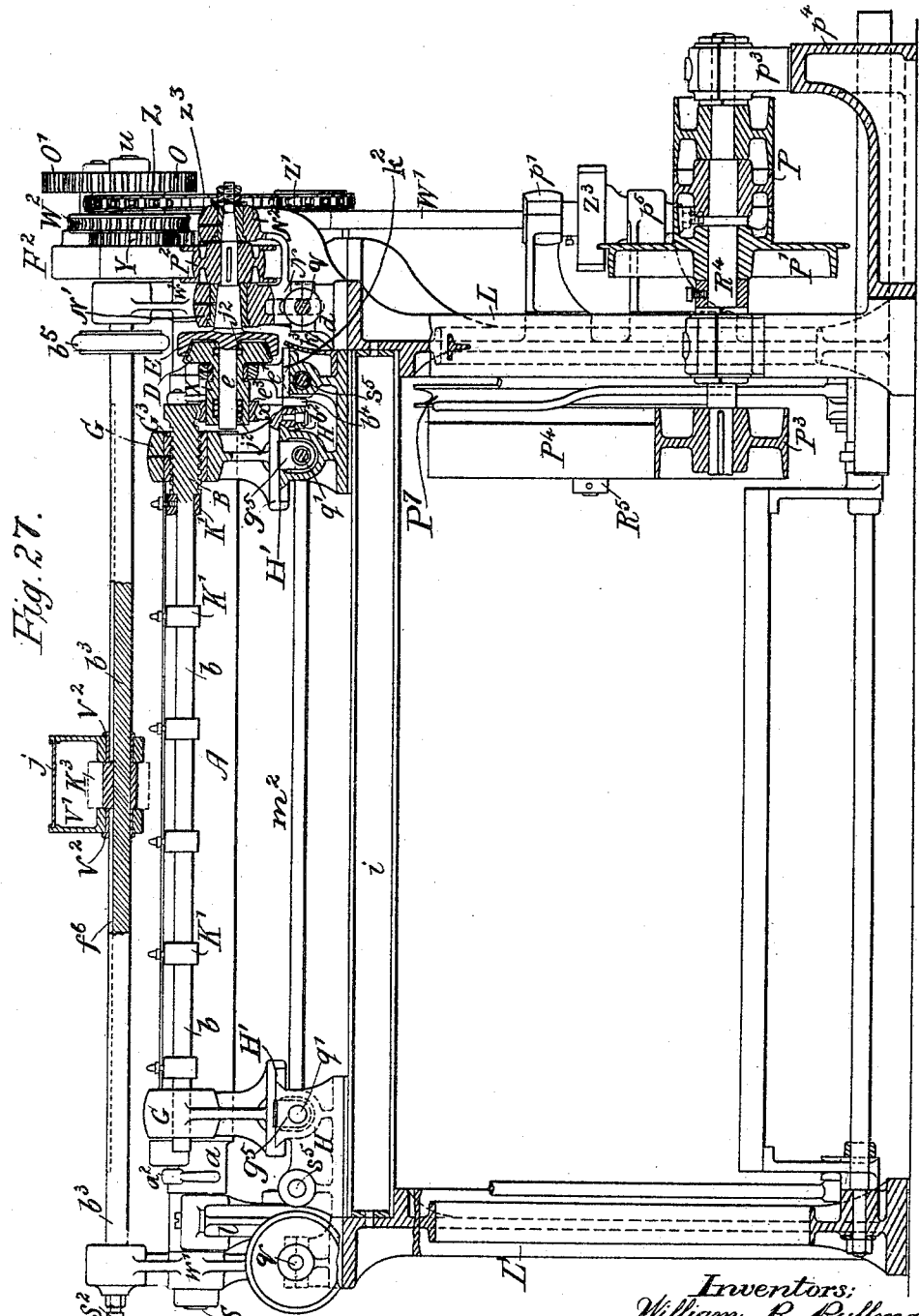

United States Patent Office.

WILLIAM R. PULLMAN AND HARRY SMITH, OF GODALMING, ENGLAND.

MACHINE FOR TREATING HIDES.

SPECIFICATION forming part of Letters Patent No. 491,446, dated February 7, 1893.

Application filed November 7, 1891. Serial No. 411,206. (No model.) Patented in England January 3, 1891, No. 131.

*To all whom it may concern:*

Be it known that we, WILLIAM ROBERT PULLMAN, leather-manufacturer, and HARRY SMITH, foreman, subjects of the Queen of Great Britain, residing at Godalming, in the county of Surrey, England, have invented new and useful Improvements in Machines for Treating Hides, (for which we have obtained a patent in Great Britain, No. 131, bearing date January 3, 1891,) of which the following is a specification.

Our invention relates to improvements in machinery or apparatus for performing upon green or manufactured, or upon partly manufactured hides or skins operations for the proper finishing of the same, such as grounding, paring, fleshing, shaving, frizzing, reducing, staking, and leveling.

The object we have in view in this our said invention is to provide efficient and economical machinery or apparatus so as to dispense with the necessity of using skilled and expensive hand labor, and to allow of operations such as above enumerated being performed with much greater rapidity than heretofore and consequently at a reduced cost but with a result closely resembling that of hand labor. We provide suitable frames and on these frames are arranged bearings for carrying the two ends of a barrel or perch roller capable of rotation: This barrel or perch roller is provided with a longitudinal slot or opening having a hinged lid or cover: One of the edges of the hide or skin to be operated upon is inserted therein, and firmly held in position by the cover closing upon it; suitable devices are provided by means of which the cover is opened and firmly closed down and we so arrange that suitable gearing shall cause this barrel or perch roller to slowly revolve and wind the hide or skin round it while being operated upon by rapidly working knives or cutters; and the bearings carrying the barrel or perch roller are fitted in vertical slides in order to allow of the whole being freely moved up and down as hereinafter described. We also provide a tension bar over which the hide or skin may be strained to the proper degree of tension and held thus. On the strained surface of the hide or skin between the barrel and the tension bar we cause the knives or cutters to act, and in order to effect this we arrange in front of the tension bar, and in suitable bearings, a shaft to which is imparted by means of cams or eccentrics a rapid rocking motion: From this rocking shaft extend arms the outer extremities of which carry a flat knife or cutter, which has a certain radial or vibratory motion, and we also cause the shaft (and with it the knife) to have a little motion endwise, as hereinafter described, by means of screw bearings. Moreover we provide for the use of a rotary knife or cutter mounted on a long shaft carried in bearings pivoted on the shafts or studs of the barrel or perch roller; this rotary knife or cutter is brought down onto the surface of the hide or skin when the flat knife or cutter is moved backward and upward by the manipulation of certain gear, and the same gear brings the various knives or cutters into position for sharpening as hereinafter described: When the flat knife or cutter is working the rotary cutter is stopped and vice versa, and we provide proper gear for effecting this result also. The shaft on which the rotary knife or cutter is mounted has a long keyway, in which the key of the cutter moves, so that the cutter with the box or guard covering it may be easily pushed along the shaft, so as to act on any desired portion of the hide or skin. The box or guard is fitted with a glass cover so that the operator can see through; also on the top is a gage to which the knife or cutter blades can be sharpened and set up, and this gage is so arranged that it can be kept up out of the way when not in use, or can be readily let down over the cutters when it is desired to adjust them after sharpening: The rotary knife shaft may be driven by friction, that is to say, on one end of it we provide a friction pulley which, when in work, presses against the periphery of a friction pulley on the cam or eccentric shaft for driving the vibratory flat knives.

In order that the vibratory flat knife and the rotary knife shaft may always be parallel to the barrel or perch roller and tension bar we arrange that the gear for manipulating them shall be in duplicate, one set being at either end of the machine, and connected together by a miter or bevel wheel shaft or other suitable device so that the two sets act simultaneously on the turning of a handle by the operator, which arrangement we will presently describe. The shaft or spindle from which motion is imparted to the cutters or knives is mounted in proper bearings, and carries on its outer end (between the said bearings) a driving pulley, and on its inner end a friction pulley whose interior is coned corresponding to a cone on the eccentric or cam for working the vibratory flat knife which cone may be covered or faced with leather or other similar material as shown on the drawings. The cam or eccentric may be made in one piece with its driving cone, and we provide between them a journal or neck which runs in a kind of bearing or support; this support we use for the purpose of pushing the friction cone in and out of gear, and we make its lower portion in the form of a slide, one end of which is pressed against by a spring for pushing it out of gear, and the other end by a roller for putting it into gear: We also provide on the roller end of this slide an inclined plane or wedge for allowing the spring to act: Now when the rotary cutter is in use, the friction pulley shaft (on which the eccentric is mounted) is running at the same high rate of speed, but the eccentric is at rest, and to insure this we provide the interior of the eccentric and cone piece with chambers fitted with a number of small hard steel balls which alone rest on the shaft, by this means we reduce the tendency of the shaft to rotate the eccentric and cone piece. The eccentric is provided with a grooved collar or a sliding block, and over this collar or sliding block the fork or crutch on the end of the rocking shaft is passed, and by this means we obtain a proper vibratory motion for the flat knife: Immediately beyond the fork the rocking shaft is turned to a larger diameter than its remainder, and on this part we cut a quick running screw thread, the result being that we get a certain motion endwise, and thus obtain a kind of draw cut on the surface of the hide or skin. This screwed portion is provided with a bushed bearing, and the other end of the rocking shaft may be a plain bearing: We sometimes however also make this a screw bearing. Both bearings are formed in suitable brackets the lower portions of which are provided with slides and slide screws working in nuts on their under sides, similar in arrangement to that of an ordinary lathe: On the front end of each of the slide screws we provide a toothed wheel which gears into a pinion mounted on a short shaft carried in bearings underneath the sliding support of the eccentric piece, and on the other or rear end of this short shaft is a miter wheel gearing into a corresponding one on the end of a long shaft running almost the entire length of the machine, and working the duplicate gear. In front of the pinion on the short shaft is a lever or hand wheel, for working the two sets of gearing. This pinion also engages with another toothed wheel which is on the end of the shaft for raising and lowering the rotary cutter: This shaft is made in two pieces connected by a universal ball joint coupling which we use for the reason following:—We prefer that the vibratory flat knife shall work on the hide or skin when the barrel or perch roller is at its highest, and the rotary knife when at its lowest position, but we so arrange that the rotary one may be raised or lowered when required without regard to the position of the barrel or perch roller: The second portion of the shaft for so doing has a worm or screw on its farther end, and is kept always in gear with a worm segment cut on the under part of the pivoted bearing for the rotary cutter shaft at each end of the machine, and proper swivel worm boxes with bearings for the shaft ends are fitted to the vertically sliding blocks in which the barrel or perch roller has its bearings. If a few turns are given to the short pinion shaft, the result will be that simultaneously the vibratory flat knife is stopped as the eccentric piece is thrown out of gear by means of the friction clutch release arrangement, the rocking shaft is drawn back and the knife turned upward into position for sharpening, leaving a clear way for the rotary cutter which is brought down on to the surface of the hide or skin, and is driven by reason of the pulley on its shaft being pressed against the periphery of the friction pulley whose interior has hitherto been driving the vibratory flat knife by means of the cone on the eccentric piece. The barrel or perch roller may be raised and lowered by a treadle or other motion of any ordinary construction which needs no description but we prefer to use the special device shown on the drawings wherein we employ a long shaft running the entire length of the machine; between the side frames, at either end of this shaft we fix a lever carrying a roller which comes directly under the block containing the bearing for the barrel or perch roller, and in the center of this shaft we provide a worm segment which is in gear with a suitable worm, and is operated by a hand wheel immediately in front of the machine or in other convenient position for the operator. Mounted on the right hand side frame of the machine is a smaller frame, hereinafter called the gear frame, having a slot or opening through which extends one end of the shaft or stud of the barrel or perch roller, and we provide here a spur wheel, or a friction pulley, fitted securely on the extended end of the shaft or stud aforesaid, and at the top and bottom of the gear frame we provide other similar spur wheels or friction pulleys, so that whether in the high or low position the barrel or perch roller may be driven at the same rate of speed, and in the same direction, by one or other of the wheels or pulleys on the gear frame, which are connected to each other by chain wheels and chain as shown on the drawings. The spur wheel or friction pulley and chain wheel at the top of the gear frame are shown as being in one piece with a worm wheel and another toothed wheel: The motion which is imparted to this gear is transmitted in the first instance to the worm wheel from a worm mounted on a vertical shaft whose lower end is provided with a bevel or a screw gear wheel as shown on the drawings engaging with a similar bevel or screw gear wheel on a shaft driven by a band from the main shaft of the machine as shown; proper driving pulleys being employed in all cases. And by a modification of our invention we sometimes use a compound or double acting vibratory flat knife arrangement in which two such knives are brought to bear on the surface of the hide or skin in lieu of the single arrangement aforementioned; for this purpose we provide two eccentrics with forked or clutched straps to receive sliding blocks or bushes fixed on the ends of the two shafts on each of which are mounted arms whose outer extremities carry flat cutters or knife blades; one of the shafts may be solid, and the other is of a semi-tubular form through which the first mentioned shaft passes: We also provide two screw bearings in this arrangement which are hereinafter fully described.

Suitable means, preferably clutch devices, are provided so that the flat knife slide screws and the rotary cutter worm shafts can be worked independently, at will of the operative. Also in front of the machine we provide a seat for the greater convenience of the operative. Moreover, in the rear of the machine we provide a second barrel or perch roller and an emery roller parallel to it, such emery roller being by preference constructed in the manner shown on the drawings, that is to say, a core of wood covered with an emery compound, and mounted on a shaft running in anti friction roller bearings and at a high rate of speed. The barrel or perch roller however revolves slowly and is similar in construction to the other barrel or perch roller on the front portion of the machine. The object we have in view with this device is to soften, stone, or finish the skin after it has been acted upon by the knives or cutters aforementioned. The surface of the emery roller may be grooved or fluted.

We also provide for the sharpening and setting up of the knives or cutters in the following manner:—On the top of the eccentric shaft main bearing, and also the top of the bearing for the short pinion shaft at the other end of the machine, we construct slide beds transversely to the machine and short levers for moving the slides contained therein to and fro: Brackets or blocks having bearings for the ends of a shaft are mounted on the slides in any convenient manner, and we prefer to fix securely on each of the said slides two pillars over which pass lugs or bosses on the bearing blocks, so arranged that they can be lifted up and down on the said pillars, and taken right off if desired: or they may be raised to the top of the said pillars and retained in that position by suitable means such as by passing cotters or pins through holes or grooves cut through them, so as to be out of the way of the knives or cutters. The drawings show this sharpening arrangement in position for acting on the knives or cutters, and resting on set screws by means of which we are enabled to adjust the pressure of the grinding wheel on the edges of the knives or cutters aforesaid. The bearing blocks are connected and kept rigidly in a fixed position relatively to each other by a light inverted T iron or other suitable staying device, on the underside of which we provide a rack having teeth cut to a fine pitch preferably.

The bearings contained within the blocks are provided with proper means for taking up the wear on the ends of a long light shaft which they carry; this shaft has a small friction pulley mounted on one of its ends directly over the friction driving pulley on the eccentric or cam shaft, and rapid rotation is imparted to it through an intermediate pulley which is itself driven by the friction pulley on the eccentric or cam shaft in the same manner as the rotary knife shaft: We also provide the shaft (hereinafter called the buff shaft) with a long groove or keyway by means of which we are enabled to drive the buff or grinding wheel at any point and consequently sharpen the knives or cutters throughout their length. The buff or grinding wheel we securely fix on a socket or sleeve mounted upon the shaft, and running in a suitable bearing formed in the carrier which is arranged to hang down from the T iron or other stay piece, and sliding thereon: In the interior of the socket or sleeve we provide a key that shall fit the groove or keyway in the shaft, and we sometimes, in lieu of an ordinary key, employ small hard balls, as shown in the drawings, so as to minimize the friction as the buff holding device is being drawn along the shaft: We also employ fitted in the interior of the holder a small pinion rotated by a small lever or hand wheel, and gearing into the aforementioned rack on the underside of the stay piece, and so we are enabled to move the buff or grinding wheel from end to end of the buff shaft, and consequently sharpen the entire length of the knife or cutter: Proper driving gear arrangements are provided for the machine throughout.

The mechanism described is illustrated in the accompanying drawings, in which:—

Figure 1 is an end elevation of the machine showing the various driving arrangements but with most of the details and the sharpening device removed in order to avoid confusion. Fig. 2 is a partly sectional elevation showing the gear for rotary cutter and for raising and lowering the front barrel or perch roller by means of the hand wheel and worm, but with the sharpening device and other details mostly removed. Fig. 3 is a sectional front elevation of the screw bearing, and its slide, the friction driving pulley, the fork, and eccentric with the sliding support and method of putting the friction cone in and out of gear, also part of the flat knife and rocking shaft, the tension bar, and part of the miter shaft for transmitting motion to the similar gear on the other end of the machine; the dotted circles and lines show the gear wheels. The sharpening device is here also removed. Fig. 4 is an end elevation in section through the short pinion shaft showing the screw bearing (but with the fork removed) the eccentric support, miter gear, and tension bar; the flat knife is also shown, but the arms carrying it are also removed. Fig. 5 is a plan of the screw bearing and its slide, the eccentric support, and method of putting the friction cone in and out of gear, and the miter gear for transmitting motion to the similar arrangements at the other end of the machine. Fig. 6 is an end view of the fork on the rocking shaft the flat knife and arms for carrying it, and the eccentric in section through the chamber containing the anti-friction balls. Fig. 7 is a front view of the flat knife showing the method of adjustment and taking up wear. Fig. 8 is a front elevation partly sectional showing the construction of the barrel or perch roller, and method of raising or lowering the same, also the gear for rotating it, the rotary cutter shaft and controlling device for it, and the tops of the two side frames with the gear frame are also shown. Fig. 9 is an end view showing the construction of the barrel or perch roller. Fig. 10 is a cross sectional view of the rotary cutter in its box or guard and the gage to which the blades may be sharpened and set. Fig. $10^a$ is a detail perspective view of the gage shown in cross section in Fig. 10. Fig. 11 is a front elevation of the same. Fig. 12 is a part longitudinal elevation of the barrel or perch roller showing a modification of the arrangements for fastening the lid or cover down on to the edge of the hide or skin. Fig. 13 is a front elevation (viewed from the rear of the machine) of the rear barrel or perch roller with one of its bearings, the toothed wheel rotating it and the clutch. Fig. 14 is a sectional face view of this clutch. Fig. 15 is a sectional front elevation (also viewed from the rear of the machine) of the emery roller, one of its anti-friction bearings, the slide for adjustment, and top of one of the side frames. Fig. $15^a$ is a detail sectional view on the line 2, 2, of Fig. 15. Fig. 16 is a partly sectional front elevation of the sharpening device. Fig. 17 is an end elevation of the same. Fig. 18 is an elevation taken in section through the center of the buff carrier. Fig. 19 is a plan of the sharpening attachment. Fig. 20 is a sectional front elevation of the compound or double acting vibratory flat knife arrangement. Fig. 21 is an end elevation, and Fig. 23 is a plan of the same. Fig. 22 is an end view of the two knives, and the method of attachment to their respective shafts. Fig. 24 is an end view, upon a larger scale, of the upper part of the machine. Fig. 25 is a plan of the machine, and Fig. 26 a front view, partly in section, of the emery roller and its bearings. Fig. 27 is a front view, partly in section, of the machine. Fig. 28 is a detail sectional view taken on the line 3, 3, of Fig. 19, looking in the direction of the arrow and showing the friction gearing in elevation. Fig. 29 is a horizontal sectional view taken on the line 4, 4, of Fig. 3, looking upward.

L and L' are two side frames rigidly tied or stayed together by the stay bolts $l^2$ and the girder $i$ and having light brackets extending from their fronts for the support of the seat T which may be full length of the machine.

$p^3$ is one of two plumber blocks, or other bearings carrying the main driving shaft $R^4$, and $p^4$ is one of two pedestals or stands on which the said bearings rest.

$F^2$ is the gear frame mounted on the side frame L.

The barrel or perch roller A is carried in bearings formed in the blocks $l$ which are free to slide vertically in V shaped uprights $l'$ on the top of each side frame.

At either end of the shaft $v'$ is an arm or lever $v^2$ having a roller $v$ at its extremity on which the bearing blocks $l$ rest, and in the center of the said shaft $v'$ is the worm segment $n^3$ in which gears the worm $n^2$ the shaft of which is turned by means of the hand wheel $n'$ immediately in the front and center of the machine, and is carried in a bearing $n^4$ attached to the girder $i$: From the bracket in which this bearing is formed extend two lugs terminating in bosses or cheeks, one on each side of the worm segment $n^3$. This serves to steady the shaft $v'$ and prevent the said worm segment $n^3$ from moving out of its place. By turning the hand wheel $n'$ the shaft $v'$ is partially rotated, bringing the roller ends of the levers $v^2$ up or down and consequently raising or lowering the bearing blocks $l$ as desired.

The barrel or perch roller A is of a hollow pattern with solid ends bored to truly fit the studs or short shafts S (Figs. 8 and 9) which are fitted with keys corresponding with keyways in the ends of the barrel or perch roller A, and then pressed tightly into their places (or they may be fitted into the said ends in any other convenient manner, or may be cast in). We provide the barrel A with a longitudinal slot or opening, on one of the edges of which we hinge a cover $a'$ and on the other edge we form a ledge having a groove or flute corresponding to a lip or tenon $b^*$ on the under side of the cover $a'$ in order that we may more effectually nip the edge of the hide or skin to be operated upon: On reference to the drawings Fig. 9, it will be seen that the hide or skin is represented thus held in position, and hanging down from the barrel.

Inside the barrel A we arrange two springs $c'$ one at either end, and connected to each spring is one end of a small rod $c^2$ whose other end is attached to the cover $a'$ and at each end of the said barrel is a boss or lug which is bored and threaded to receive a quick pitched screw, having on its outer end a lever $a$ and on its inner end a locking cam $a^2$; in the drawings the said cams are shown extending over and pressing on the cover $a'$ thereby nipping the skin in the groove aforementioned; by turning over the said lever $a$ as shown in dotted lines in Fig. 9 the locking cam is drawn backward by the screw until clear of the cover $a'$ and the springs $c'$ automatically push the cover $a'$ open, when the skin can readily be taken out: The relative positions of the levers $a$ and covers $a'$ when open are shown in the drawings by dotted lines. And by a modification of our invention we sometimes employ, in lieu of this, another device for nipping the skins as shown in Fig. 12, wherein we cut a screw thread on the solid ends of the barrel A to fit a corresponding screw thread in the boss of the hand wheel $a^4$ which said boss is on its inner face coned out or countersunk to a corresponding cone formed partly on the barrel A and partly on the end of the cover $a'$ at each end of the said barrel A, thereby effectually nipping the skin.

Immediately outside the bearings in the blocks $l$ and pivoted on the studs S are the swing brackets $w'$, in the upper part of which are end bearings for the rotary cutter shaft $b^3$, and the stud at the right hand or driving end is extended so as to pass through the slot $S^2$ in the gear frame $F^2$ to carry a spur wheel $Y'$ which, when the barrel is at its highest position gears into a similar spur wheel Y rotating on a stud $u$ secured in the gear frame $F^2$, but when the said barrel A is at its lowest position, the said spur wheel gears into a similar spur wheel $Y^2$ rotating on a stud $u'$ secured in the lower portion of the gear frame $F^2$, and the two spur wheels Y and $Y^2$ are connected and driven at an equal speed by a chain $z^3$ passing over the chain wheels Z and $Z'$: The means by which motion is imparted to these wheels is hereinafter described.

In suitable bearings contained within the bracket N we fit a shaft $e$ called the eccentric shaft: There are two bearings $N'$ and $N^2$, one of which is situated on each side of the driving pulley $P^2$, as shown in Figs. 25 and 27. The flanged pulley $P^2$ has a high speed transmitted to it by a band from a driving pulley $P'$ on the main shaft $R^4$, and is firmly keyed or otherwise fixed on the shaft $e$ between the bearings aforesaid and on the inner side of the main bearing $N'$ is a friction driving pulley E which may conveniently be turned solid on the shaft $e$ having its interior coned out: The shaft $e$ is extended from this pulley E and we make it of a diameter a little smaller than the eccentric piece or sleeve which we place on it, consisting of a long eccentric X and a friction cone D with a journal or neck between them. (See Figs. 3 and 6.) In the interior of the said eccentric piece are chambers or pockets to contain a number of hardened steel balls $j^2$ which bear on the shaft $e$, and we thus reduce the friction and the chance of the flat knife working when not required, that is to say when the rotary cutter or the sharpening device is in operation, the eccentric shaft $e$ being in motion the whole time. The friction cone D is turned to suit the interior of the friction driving pulley E and is covered with leather or other suitable material.

The eccentric is provided with a grooved collar or roller $C^3$ which rotates in the fork $x$ on the end of the shaft $b$, the result being that a rocking motion is imparted to the said shaft $b$, and behind the said fork we make the shaft of a larger diameter than the remainder of its length, whereon we cut a quick pitched screw thread corresponding to a similar thread cut in the interior of the bush $G^3$ securely fixed in the eye of a sliding bracket G, by which device we give an endwise as well as a rocking motion to the shaft $b$: At certain distances apart we fix on the rocking shaft a number of curved arms $K'$ to the outer extremities of which is attached a flat knife K (provided with slots $k$ for adjustment) so that the said knife is made to give a succession of quick shaving cuts to the surface of the hide or skin operated upon. The support $e'$ for the journal in the eccentric piece has a foot on which we form a slide $k^2$ fitted in a bed in the slide bracket H, and on one end of this foot is a lug extending downward, the face of which is partly an inclined plane $b^4$, and partly straight.

On reference to the drawings Figs. 3 and 5, it will be seen that there is a small roller $b^2$ on the underside of the base of the sliding bracket G and in contact with the straight part of the lug aforesaid, while the other end of the foot of the support $e'$ is pressed against by a spring $k^3$, the object being that when the sliding bracket G carrying the rocking shaft $b$ is drawn backward the inclined plane $b^4$ will allow the spring $k^3$ to push the support carrying the eccentric away, thereby putting the vibratory flat knife K out of gear, so that the rotary cutter may be brought to bear on the surface of the skin, and as the fork $x$ is always on the eccentric it follows that the knife K is turned upward at the same time, and brought into position for sharpening. The bracket G is fitted to a slide $H'$ on the slide bracket H, and on its underside has a depending lug $g^5$, which is interiorly screw-threaded to receive a screw $q'$ for moving to and fro. The shaft $q$ is carried in a bearing $d$ and has a universal or ball joint coupling $q^4$ by means of which it imparts its own movement to the worm shaft $q^2$, whose farther end is provided with a worm $w^2$ and has a bearing in the swiveling worm box $w$, the pin of which passes through the bearing block $l$. The worm $w^2$ gears with a segment cut on the underside of the rotary cutter swing bracket $w'$. On the front end of the shaft $q$ is a spur wheel $g$ similar to the spur wheel $g^2$ on the front end of the screw $q'$, and centrally between and gearing into these two wheels is a pinion $g'$ on the end of a short shaft $s^5$ which passes through a bearing underneath the sliding support $e'$, and on the rear side of this bearing we provide this short shaft $s^5$ with a miter wheel $m$, also we employ a handle or lever $S^4$, or a hand wheel, on the end of the said short shaft $s^5$ by means of which it may be rotated, and in front of the two spur wheels $g$, $g^2$, we provide clutches Q of a similar construction to that used for the barrel or perch roller on the rear part of the machine, and which we will presently describe.

The foregoing description of the knife and cutter controlling arrangements applies, as it stands, only to the right hand or driving end of the machine, but, with the exception of the eccentric and friction clutch devices, it also applies to the other or left hand end of the machine, where we provide gear precisely the same, the two sets being connected by means of a long shaft $m^2$ having at each end a miter wheel $m'$ corresponding to and gearing into the miter wheels $m$ on the rear ends of the two short shafts $s^5$, thus it will be obvious that on turning the handle or lever $S^4$ the vibratory flat knife K will be drawn back and turned upward, and the rotary cutter shaft $b^3$ will be drawn down, parallel to each other and to the barrel or perch roller A.

On the top of the girder $i$ we fix the slide brackets H, from the rear of which extend the bearings $h$ for the long miter shaft $m^2$, and the caps or covers of the said bearings $h$ are formed by the feet of the brackets $f^2$ which support the tension bar device. (See Figs. 4 and 5.)

The tension bar F may be of any form, but we prefer to use an angle iron whose upper edge is made somewhat sharp so as to enable the skin to be drawn better over it: The said tension bar is supported at each end by brackets $f^2$ and we provide for its adjustment vertically in the following manner; on its face, that is to say facing the barrel or perch roller A we rivet or otherwise fix strips $f$ which hang down over the faces of the brackets $f^2$ and in their lower ends are slots $f'$ through which pass screws $i^3$ which we loosen so as to enable us to lay thin packing pieces $f^5$ under the angle iron tension bar F and so raise it to the required level, when the screws $i^3$ are tightened so as to keep the said tension bar firm. The tension bar F is preferably placed at an angle, as shown on the drawings, as it is found that much better results are obtained than would be the case if it were arranged perfectly upright.

The rotary cutter shaft $b^3$ is carried in end bearings similar to those used for the sharpening buff shaft I, and is provided with the same set screw device $s^2$ for adjustment and taking up wear: These bearings as shown on the drawings are formed in the interior of the bosses on the upper parts of the swing brackets $w'$, and extending from behind the said bosses are short arms with other bosses through which we pass the ends of a tie bolt $g^*$ so as to firmly stay the swing brackets $w'$ in their proper relative positions to each other: The tie bolt also acts as a guide for the rotary cutter box, therefore we hereinafter term it the guide rod. On one end of the rotary cutter shaft $b^3$ and immediately over the friction driving pulley E we provide a friction pulley $b^5$ having a tire of india rubber or similar suitable material, which when the cutter is in operation presses against the periphery of the aforesaid friction pulley E, thereby receiving rapid rotation.

Along nearly the entire length of the shaft $b^3$ is a groove or keyway $f^6$ to receive the key in the interior of the rotary cutter $K^3$.

We do not confine ourselves to the particular curved shape of the rotary cutter blades shown on the drawings but we use this blade by preference: Almost any known description of rotary cutter can be used so long as a sufficiently keen edge to the blades can be obtained, and they are arranged spirally along the hub as in the case of a lawn mower cutter drum: The cutter therefore needs no further description. Also mounted on the shaft $b^3$ is a guard or cutter box $V'$ having bosses one on either side of the rotary cutter and fitted with bushes or liners $V^2$ screwed in as shown, or otherwise fixed in position: The two sides of the said guard are tied together by two tie bolts $d^2$ and $d'$ and by a narrow web on its lower part cast in one piece with the said sides, the said web having formed on it the boss through which the guide bar $g^*$ passes; the upper part of the guard is left open in order that a curved sheet of glass $j$ may be let in, so as to enable the operative to see through. Swung on the tie bolt $d'$, is the gage V consisting of two light links or arms, one at either end outside the guard sides, and attached to the said links or arms is a small rod having formed on it a chisel edge to which the cutter blades may be set up after sharpening the said blades being provided with slots for that purpose, similar to those in the vibratory flat knife, as shown in Fig. 7. The said gage may be kept up out of the way as shown in the drawings by any suitable means such as a small snap spring or catch, or may simply be nipped so as to move stiffly on the tie bolt $d'$; the dotted lines show its position when in use.

On the top of the main bearing N' for the eccentric shaft, and also on the top of the bearing for the short pinion shaft $s^5$ at the other end of the machine, are slide beds $N^3$ wherein are fitted the slides of the blocks M M' carrying the sharpening attachment: Rising from, and securely fixed in the said blocks are pillars $t^2$, there are two such pillars to each of the blocks aforesaid, and they are truly turned to fit in the lugs or sockets formed on the sides of the bearing blocks, which are capable of being raised and lowered on the said pillars. The two bearing blocks are securely tied together at their tops by a light inverted T iron I, having cut on its under side a long rack $I^2$ of somewhat finely pitched teeth. About the center of the blocks are bearings $e^*$ for the ends of the buff shaft I, provided with set screw adjustments $e^2$ consisting of set screws and lock nuts with washers interposed between the points of the said set screws and the bushes. Truly fitted in these bearings at its two ends, is a long light shaft $I^3$ called the buff shaft, having cut along nearly its entire length a groove, flute, or keyway, and on the right hand or driving end of this shaft we provide a friction pulley $E^4$ driven at a high velocity by an intermediate friction pulley $E^3$ fitted with a tire of india rubber or similar suitable material, and rotating on a pin fitted between the links $g^3$ and $g^4$, these two links hang down from the buff shaft I and are mounted one on either side of the small friction pulley $E^4$; the intermediate friction pulley may however be carried in any other convenient manner. The said intermediate friction pulley $E^3$ is driven by the periphery of the friction driving pulley E precisely in the same manner as the similar pulley on the rotary cutter shaft aforementioned.

Suspended from the flange of the inverted T iron tie bar and sliding on it, is the buff carrier U having on its lower portion a boss, bored and lined, or bushed, to receive the buff holder, which revolves within it and is kept in position by a collar on one side of the said boss and by lock nuts and washers on the other.

On the right hand end of the holder we mount a small emery wheel or buff $u^3$ and hold it securely in its proper position between washers of leather or other suitable material by means of lock nuts as shown on the drawings. In the interior of the holder we form a chamber or groove in which we place a key, or a number of hard steel balls $t^5$ corresponding to the groove or keyway in the buff shaft and we retain the same in their place by means of a key $t^4$ whose outer end is threaded to correspond with the end of the holder, a slot being formed in the said end of the holder to receive it; it follows therefore that the locknuts employed to retain the holder endwise in its bearings also keep the said key $t^4$ in place.

In the upper part of the buff carrier U and immediately beneath the inverted T iron tie bar, we form a pocket within which we fit a small pinion $P^6$ gearing into the rack $I^2$, mounted on a small shaft $i'$ and rotated by the operative by means of a lever or handle $u^2$ so that the buff with its carrier can be moved to any position lengthwise on the buff shaft $I^3$ for sharpening the knives or cutters: Extending from the rear, and on the top of the right hand bearing block is the arm $z'$, and a similar arm $z^2$ extends from the eye of the link $g^4$; between these two arms, and attached to them, we place a spring $z$ by which means we keep the intermediate friction pulley $E^3$ pressed well down on to the friction driving pulley E.

On the main bearing brackets N and directly under the front of the slides $N^3$ are two lugs between which, pivoted on studs or pins $n$, we fit the eyes of small levers $h^2$ having rollers $h^4$ within the chambers $h^5$ in the sliding blocks M and M'; this device enables us to move the sharpening attachment to and fro to act on the knives and cutters, which is sufficient for horizontal adjustment, and the set screws $t^3$ effect a similar purpose vertically.

By a modification of our invention (shown in Figs. 21, 22, and 23) we sometimes employ a compound or double acting vibratory flat knife arrangement wherein we provide two eccentrics X' and $X^2$ fitted with straps having forks $x'$ and $x^2$, thereby imparting a rapid rocking motion to two distinct shafts $b'$ and $b^2$, (the latter being semi cylindrical in cross section and partly inclosing the former) each of which is connected to a flat knife or cutter. For this purpose we provide a sliding bearing G' and $G^2$ at either end of the machine, and we fit securely in these bearings the bushings $G^4$ and $G^5$ whose interiors are cut with a quick acting screw thread as in the former arrangement herein described.

Secured to one end of the semi-cylindrical shaft $b^2$ is a sleeve B' which extends through the screw threaded bushing $G^4$ and is correspondingly threaded to fit the same. The shaft $b'$ extends through the said sleeve B' and is provided at its other end with an enlarged portion or bushing $B^2$ which is screw threaded to correspond with the bushing $G^5$ of the bearing $G^2$, in which it fits. The eccentric $X^2$ rotates in a strap having a fork or crutch $x^2$, in which we fit the bush or block $C^2$ on the end of the screw B'; this sleeve corresponds to the bush $G^4$ and on the other end of the said screw on the inner side of the bearing G' we fit the end of the semi-tubular shaft $b^2$ having riveted or otherwise fixed to it a number of arms $K^3$ whose outer extremities carry the flat knife $K^2$: Passing through and fitting freely in the eyes of the said arms $K^3$ and the screw B' each of which is bored for the purpose, is a solid shaft $b'$, to the left hand end of which we securely fit a socket $B^2$, the outside of which is threaded to correspond with the quick acting screw thread cut in the interior of the bush $G^5$ and we fix on this shaft also the eyes of a number of arms K' whose outer extremities carry a flat knife K. On the right hand end of the said shaft $b'$ we firmly fit a sliding block or bush C' arranged to slide in the fork $x'$. The whole is made to slide on slide brackets H as in the arrangement for the single acting vibratory flat knife hereinbefore described and for this purpose the slides H' are provided in the bases of the screw bearing brackets. Moreover we provide means for softening, stoning, or finishing the surface of the hide or skin after it has been acted upon by the knives and cutters aforesaid, as follows:—On the stud $u$ in the gear frame $F^2$ we cause to rotate a spur wheel O gearing into another intermediate spur wheel O', the said intermediate wheel O' is also in gear with a similar spur wheel O² on the end of the stud S' of the second barrel or perch roller A' in rear of the machine. See Figs. 1 and 24 in which the gear wheels O, O', and O², are shown in dotted lines, in order to clearly show other parts of the machine, a few teeth only of the said wheels being shown.

It must be borne in mind that Figs. 13 and 15 are elevations looking on the rear of the machine, so that Fig. 13 shows the left hand end of the barrel or perch roller A' and Fig. 15 shows the right hand end of the emery or stoning roller; the grooved driving pulley $r^2$, however, may be mounted on either of the ends of the shaft $r$.

On further reference to the drawings, it will be seen that the spur wheel O² is arranged to run free on the end of the stud S' in order that the barrel A' may not be rotated unless the clutch Q' is pushed into gear with it; the said clutch Q' is keyed on the stud S' and has formed on its face a number of jaws or projections as shown in Fig. 14, between which fit corresponding jaws or projections on the face of the spur wheel boss.

The barrel or perch roller A' is precisely of the same description as the one employed on the front part of the machine, and is used for the same purpose, and is carried by its studs S' in proper bearings formed in the slide brackets B⁴ mounted on the side frames L and L'. Also on the slide brackets B⁴ we form slides B⁵ for the bases of the brackets O³ carrying the anti-friction roller bearings $r^4$, for the ends of the emery roller shaft $r$. Suitably bored for the purpose is a long roller R of wood into which is pressed tightly the shaft $r$, and on each end of the said roller R we secure a dished collar or ferrule immovably fixed to the shaft $r$ by means of a key and set screw as shown on the drawings; one of the said dished collars or ferrules may have the grooved driving pulley $r^2$ formed in one piece as shown. The ends of the roller shaft $r$ are carried between the rollers $r^4$, and passed beyond them through a clear hole in the bracket O³, and on the said ends we place spring washers $r^3$ kept in place by pinned collars; by this means we give the shaft a little freedom but prevent positive end play. The roller may, however, be made to move longitudinally backward and forward, as well as to revolve. The slide B⁵ is provided with depending lugs B⁶ interiorly screw threaded to correspond with a screw $b^7$ which may be operated by a small hand wheel $b^6$, or other suitable device.

Toward the rear of the machine (Figs. 1 and 27) and on the right hand or driving end side frame L, we provide a bearing R', for a countershaft R⁵ carrying a pulley P⁴ on the inner side of the side frame, and driven by a band from a driving pulley P³ on the main shaft R⁴, and contiguous to it we provide another pulley P⁷ about the same diameter, by preference grooved to correspond with the small pulley $r^4$ on the emery roller shaft, which it drives. On the outer end of the countershaft R⁵ we mount a screw gear wheel Z⁴ engaging a similar wheel Z³ on a vertical shaft W' which we call the worm shaft; the said worm shaft is supported in two ordinary bearings $p$ and $p'$ and one step bearing $p^5$, having the set screw adjustment $p^6$; on the top end of worm shaft W' is keyed a worm W gearing into the worm wheel W² by which means a slow rotation is imparted to the wheels W², Y, Z, and O which wheels are all secured together and mounted on the stud $u$, the sprocket wheel Z, by the chain $z^3$, imparts motion to the sprocket wheel Z' which latter carries the gear wheel Y² and motion is imparted to the perch roller A when its gear wheel Y' is moved into engagement with either the gear wheel Y or Y², as hereinbefore described. The spur wheel O meshes with the spur wheel O' which in turn gears with the wheel O², and when the clutch Q' is in engagement or locked the motion of these wheels is imparted to the perch roller A' as will be readily understood.

We do not confine ourselves to the screw gear wheels Z⁴, Z³, for revolving the worm shaft W' and may use bevel or other gear for that purpose.

In the gear frame F² we provide a radial slot through which we pass the spindle $r^5$ of the stud $r'$ for carrying the intermediate gear wheel O' the said stud being held in the slot by the nut $r^6$ so that we are enabled to move the said intermediate wheel up and out of gear with the other wheels when it is not required to use the rear side of the machine; and also that we may keep it in gear by dropping it should the bracket B⁴ carrying the barrel or perch roller A' and the emery roller R be drawn backward to the ends of the side frames L, L'. The main shaft R⁴ may be driven by a band through which is transmitted motion to the pulley P.

We may use any suitable description of gear for starting and stopping the machine.

The hide or skin to be operated upon by the knives or cutters having been secured in the barrel or perch roller A by one of its edges, is laid over the tension bar F and firmly grasped in the hands of the operative; the knife or cutter having been brought to bear, the machine is started, and the skin is drawn slowly against the edges of the said knife or cutter, and wound on the barrel or perch roller A until the whole surface of the skin has passed under their action; and should it be found that one such pass has not sufficiently treated the skin, the barrel or perch roller A may be put out of gear by raising or lowering when the skin may be unwound by turning over the said barrel or perch roller in the reverse direction, it may then be put into gear again and the operation repeated.

When it is desired to use the emery or stoning roller, the hide or skin should in like manner be secured by one of its edges in the barrel or perch roller A' which is then put into gear by means of the clutch; and by the workmen holding and pressing the skin against the revolving emery roller R a softening and finishing of the surface of the skin is obtained. The skin is in this case also wound on the barrel A' and its surface travels in a direction contrary to that in which the emery roller is running.

What we claim and desire to secure by Letters Patent of the United States, is:—

1. In a machine of the class herein described, the combination with a perch roller, having a longitudinal slot in one side thereof; a hinged door to close said slot and bind the edge of the hide thereunder; means for holding the said door down upon the hide; and means for rotating the said perch roller, of vibrating knives to operate upon the hide, substantially as described.

2. In a machine of the class herein described, the combination with a perch roller, having a longitudinal slot in one side thereof; a hinged door to close said slot and bind the edge of the hide thereunder; means for holding the said door down upon the hide; and means for rotating the said perch roller, of a tension bar and means for dressing the hide, substantially as described.

3. In a machine of the class herein described, a perch roller consisting of a hollow cylinder mounted in antifriction bearings and having a slot in one side thereof, a door hinged to one edge of the said slot, to close upon and bind the edge of the hide against the opposite edge of the slot; and cams upon the said roller to turn down upon and bind the said door upon the hide, substantially as described.

4. In a machine of the class herein described, a perch roller consisting of a hollow cylinder mounted in antifriction bearings and having a slot in one side thereof, a door hinged to one edge of the said slot, to close upon and bind the edge of the hide against the opposite edge of the slot; and cams upon the said roller to turn down upon, and bind the said door upon the hide, and springs within the roller to open the door when released from the cams, substantially as described.

5. In a machine of the class herein described, the combination with a rock shaft $b$ having screw threads cut upon a part thereof; a fork $x$ upon one end of the said shaft; arms carrying knife blades secured to the shaft; a bearing G having screw threads to engage the threads upon the shaft; of a shaft $e$ geared to the operating parts of the machine, and having the female member E of a friction clutch thereon; an eccentric X mounted with antifriction bearings upon the shaft $e$, to rotate within the fork $x$ and vibrate the frame; the male member D of the said friction clutch upon one end of the said eccentric; and means for moving the male member D of the clutch into and out of engagement with the female member E, substantially as and for the purposes described.

6. In a machine of the class herein described, the combination with a rock shaft $b$ having screw threads cut upon a part thereof; a fork $x$ upon one end of the said shaft; arms carrying knife blades secured to the shaft; a sliding bearing G having screw threads to engage the threads upon the shaft; a depending roller $b^2$; and a screw $q'$ to slide the said bearing, of a shaft $e$ geared to the operating parts of the machine and having the female member E of a friction clutch thereon; an eccentric X mounted with antifriction bearings upon the shaft $e$, to rotate within the fork $x$ and vibrate the same; the male member D of the said friction clutch upon one end of the said eccentric; a sliding bearing for the said eccentric having a depending lug with an inclined plane $b^4$ to engage the roller $b^2$; a spring $k^3$ to normally press the member D of the clutch away from the member E; and means for operating the said devices, substantially as and for the purposes described.

7. In a machine of the class herein described, the combination with a shaft $b^3$ having a friction roller $b^5$; pivoted bearings $w'$ in which the said shaft is journaled, toothed segments attached to the said bearings, a shaft $q^2$ having a worm $w^2$ to engage the teeth of the said segments, and means for rotating the shaft $q^2$ to turn the said bearings and bring the friction pulley in contact with the operating part of the machine; of a rotary cutter $K^3$ mounted upon the shaft $b^3$ in position to operate upon the hide, substantially as and for the purposes described.

8. In a machine of the class herein described, the combination with a shaft $b^3$ having a friction roller $b^5$, pivoted bearings in which the said shaft is journaled, toothed segments upon the said bearings, a shaft $q^2$ having a worm to engage the toothed segments and means for rotating the said shaft to turn the bearings and bring the friction pulley upon the shaft $b^3$ into engagement with an operating part of the machine to impart rotary motion to the said shaft; of a rotary cutter keyed upon the shaft $b^3$, and free to slide longitudinally thereon; a cutter box inclosing the cutter and loosely mounted upon the said shaft, a guide rod rigidly connecting the two bearings together and passing through the cutter box to guide the latter; a glass $j$, inserted in the upper part of the cutter box; and a gage V pivotally attached to the said cutter box, substantially as and for the purposes described.

9. In a machine of the class described, the combination of a perch roller, a door upon the said perch roller to bind the hide thereon, means for rotating the said perch roller; a tension bar over which the hide passes, a rock shaft $b$, having arms to which knife blades are attached, a fork $x$ upon the end of the said rock shaft, a sliding bearing box G, in which the rock shaft has a screw bearing, thereby imparting longitudinal movement to the said shaft; a screw shaft $q'$ having a bearing in the frame of the machine and entering a threaded aperture in the bearing box G, a toothed wheel $g^2$ mounted loosely upon the screw shaft $q'$, and a clutch to clutch the toothed wheel to the screw shaft; a roller $b^2$ journaled in and depending from the bearing box G; a shaft $e$ journaled in the frame of the machine and geared to the operating parts thereof; the female member E of a friction clutch upon the said shaft $e$; an eccentric X mounted with antifriction bearings upon the shaft $e$ and carrying the male member D of the friction clutch; a sliding bearing $e'$ for the said eccentric, an inclined plane $b^4$ to engage the roller $b^2$, and hold the two clutch members together, a spring $k^3$ which tends to press the clutch members apart; a shaft $b^3$ having a friction roller $b^5$; a rotary cutter mounted upon the shaft $b^3$; pivoted bearings $w'$ in which the said shaft is journaled; toothed segments attached to the said bearings; a worm shaft having a worm to engage the teeth of the said segments; a toothed wheel $g$ mounted loosely upon the said worm shaft, and a clutch to clutch the toothed wheel to the worm shaft: a shaft $s^5$ journaled in the frame of the machine, a toothed wheel secured upon the shaft $s^5$ and meshing with both of the wheels $g$ and $g^2$; and a handle upon shaft $s^5$ whereby the several parts can be operated to engage the members D and E of the clutch and so cause the knives upon the rock shaft $b$ to operate upon the hide, or to withdraw the said knives, disengage the clutch, and lower the shaft $b^3$ to bring the friction pulley thereon in engagement with the clutch member E, and the rotary cutter in position to operate upon the hide; substantially as and for the purposes described.

10. In a machine of the class herein described, the combination with a shaft $v'$ journaled at its ends in the frame of the machine; arms $v^2$ upon the said shaft; rollers $v$ upon the ends of the said arms; a toothed segment $n^3$ upon the shaft $v'$; a worm shaft journaled in the frame of the machine, the worm of which meshes with the toothed segment $n^3$, and a hand wheel $n'$ by which the worm shaft may be turned to rotate the shaft $v'$; of uprights $l'$; bearing blocks $l$ resting upon the rollers $v$ and free to slide in the said uprights; and a perch roller A' journaled in the bearing blocks $l$, which will be raised or lowered when the shaft $v'$ is turned, substantially as and for the purposes described.

11. In a machine of the class herein described, the combination with a perch roller; bearing blocks $l$ in which the said perch roller is journaled, uprights $l'$ in which the said bearing blocks are free to slide; a toothed pinion Y' upon the end of one of the journals of the perch roller; a sleeve having a spur wheel $Y^2$ on one end and a sprocket wheel Z' on the other, mounted just below the pinion Y'; a sleeve having a spur wheel Y on one end, a sprocket wheel Z geared to the wheel Z', and a spur wheel O geared to the operating part of the machine, mounted just above the pinion Y', of a shaft $v'$ journaled at its ends in the frame of the machine; arms $v^2$ upon the said shaft; rollers $v$ upon the ends of the said arms upon which the bearing blocks $l$ rest; a toothed segment $n^3$ upon the shaft $v'$, a worm meshing with the said segment and having a shaft journaled in the frame of the machine; and a hand wheel $n'$ by which motion may be imparted to the shaft $v'$ to raise or lower the perch roller and bring the pinion thereon in engagement with the spur wheel Y or $Y^2$, substantially as and for the purposes described.

12. In a machine of the class herein described, the combination with a perch roller A', having a clamp to hold the edge of a hide, and means for rotating the said roller; of a stoning or emery roller R in position to operate upon the said hide; a shaft $r$ extending therethrough; a grooved pulley $r^2$ geared to the operating part of the machine to impart rotary motion to the said roller; bearing blocks $O^3$ through which the ends of the shaft $r$ pass; antifriction rollers $r^4$ journaled upon the bearing blocks $O^3$, upon which rollers the shaft $r$ is supported; and spring washers $r^3$ upon the ends of the shaft $r$ whereby the said roller is allowed a little freedom in its bearings, substantially as and for the purposes described.

13. In a machine of the class hereindescribed, the combination with a perch roller, having a longitudinal slot in one side thereof; a hinged door to close said slot and bind the edge of the hide thereunder; means for holding the said door down upon the hide; and means for rotating the said perch roller; of an adjustable tension bar; sliding bearing supports G', $G^2$, having screw-threaded bearings therein; a rock shaft $b'$ having at one end an enlarged screw threaded portion $B^2$ to engage the screw threads in the bearing support $G^2$; a fork $x'$ upon the opposite end, arms K' secured upon the said shaft $b'$, knife blades K secured to the outer ends of the said arms; a sleeve B' exteriorly screw threaded to engage the threads in the bearing support G' and mounted loosely upon the shaft $b'$; a curved piece $b^2$ secured to the sleeve B' and partly encircling the shaft $b'$; arms $K^3$ secured to the curved piece $b^2$, knife blades $K^2$ upon the ends of the arms $K^3$; a fork $x^2$ secured upon the end of the sleeve B′; a shaft geared to the operating parts of the machine; an eccentric sleeve mounted upon the said shaft and having opposite eccentrics to operate within the forks $x'$ and $x^2$ respectively, and means for clutching the said eccentric sleeve to the said shaft to impart vibratory motion to the shaft $b'$ and sleeve B′; substantially as and for the purposes described.

In testimony whereof we have hereunto set our hands in the presence of two witnesses.

WM. R. PULLMAN.
HARRY SMITH.

Witnesses:
EDMUND EDWARDS,
R. E. POOLEY.